(No Model.)  2 Sheets—Sheet 1.

W. H. NEWTON.
GRAIN DRILL.

No. 357,850.  Patented Feb. 15, 1887.

Witnesses:
John Enders, Jr.
Thos. M. Gill.

Inventor:
William H. Newton
By Ayers & Co.
Attorneys:

(No Model.) 2 Sheets—Sheet 2.
W. H. NEWTON.
GRAIN DRILL.
No. 357,850. Patented Feb. 15, 1887.
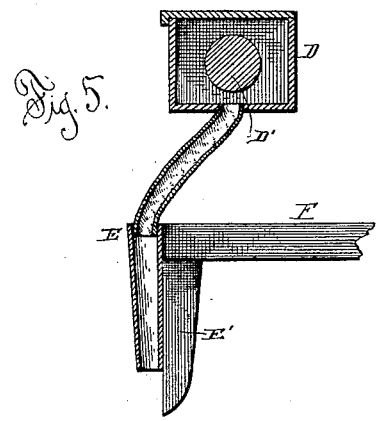
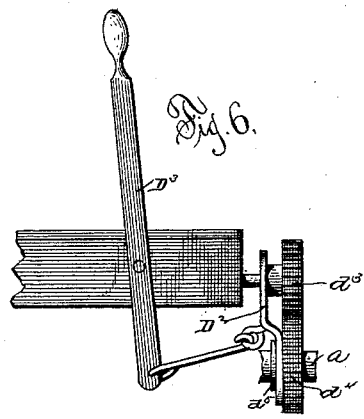
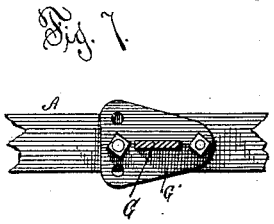
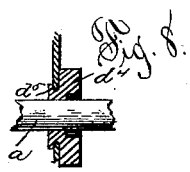

UNITED STATES PATENT OFFICE.

WILLIAM H. NEWTON, OF ASSUMPTION, ILLINOIS.

GRAIN-DRILL.

SPECIFICATION forming part of Letters Patent No. 357,850, dated February 15, 1887.

Application filed August 19, 1886. Serial No. 211,291. (No model.)

*To all whom it may concern:*

Be it known that I, WILLIAM H. NEWTON, a citizen of the United States of America, residing at Assumption, in the county of Christian and State of Illinois, have invented certain new and useful Improvements in Grain-Drills, of which the following is a specification, reference being had therein to the accompanying drawings.

This invention pertains to improvements in grain or seed drills, while it is adapted to serve as a cultivator; and it consists of the combination of parts, including their construction, substantially as hereinafter set forth, and pointed out in the claims.

Figure 1:
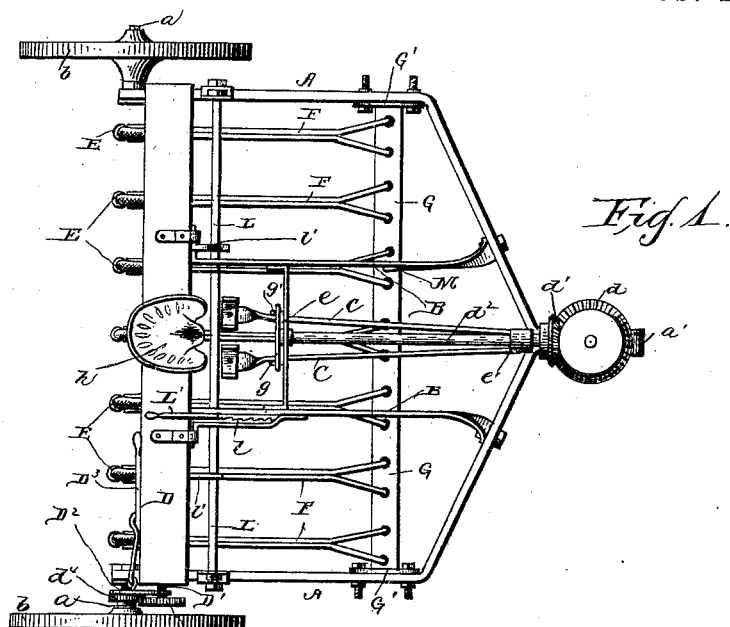
Figure 2:
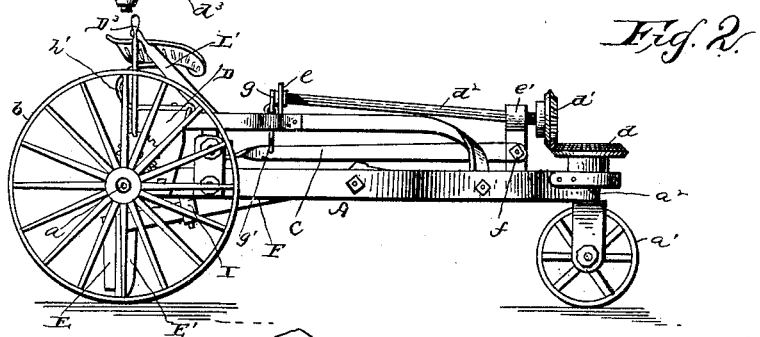
Figure 3:
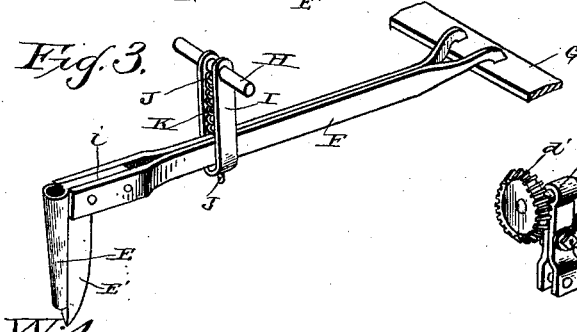
Figure 4:
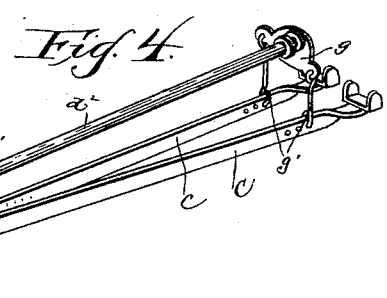

In the accompanying drawings, Figure 1 is a plan view of my invention. Fig. 2 is a side elevation thereof. Figs. 3 and 4 are detail views thereof, and Figs. 5, 6, 7, and 8 are detail views.

In the embodiment of my invention I employ a frame, A, of usual construction, the rear ends of the side bars thereof carrying short axles $a\ a$, having wheels $b$, while at the front of said frame, about centrally thereof, is a swiveled guide or caster wheel, $a'$, the spindle of said latter wheel passing through an eye, $a^2$, upon the frame. Upon the upper end of said spindle is secured a beveled pinion, $d$, with which engages a similar but smaller pinion, $d'$, on the forward end of an inclined shaft, $d^2$, supported at its rear end in an upwardly-projecting portion of a cross piece or bar, $e$, fastened to the longitudinal side pieces or bars of an arched frame or bridge, B, which frame or bridge B is secured to the seed or grain hopper or box and the front of the frame A. The forward end of this inclined shaft $d^2$ is supported immediately in rear of its beveled pinion $d'$ by an upwardly-projecting clip, $e'$, secured to an inwardly-projecting bar secured between the forward meeting ends of the side bars of the frame A in rear of the swiveled guide or caster wheel $a'$.

C C are two foot levers or treadles, the forward ends of which are pivoted upon a common pivot or rod, $f$, passed through corresponding openings or apertures in the clip $e'$. The levers or treadles C C are connected, a short distance from their rear ends, with a pivoted cross-bar or walking-beam, $g$, of the shaft $d^2$ by links or rods $g'$, which latter are connected with adjusting perforations or apertures in the levers, whereby the guide or caster wheel may be caused to describe a greater or less curvature, according to the curve it may be desired to give to the machine in turning.

Of course it will be understood that by exerting more or less pressure upon one treadle or lever C than upon the other, the line of travel of the guide or caster wheel will be changed as desired, and accordingly affect the movement of the machine, while, by applying equal pressure upon each treadle or lever, the said wheel will maintain the same or a straight-ahead movement.

D is the seed or grain box or hopper, which is secured upon short uprights rigidly fastened to the inner sides of the rear ends of the side bars of the frame, and which hopper or box is provided in its bottom with a series of alternating seed-dropping openings, and within which box or hopper is arranged or employed a stirring or agitating roll, D', hereinafter described, to facilitate the dropping through the said openings or apertures of the seed or grain. Secured to the lid or cover of the seed box or hopper D is the driver's seat $h$, being supported upon a bent spring-bar, $h'$, fastened to the said lid or cover at one end, and its other end secured to said seat. The stirring or agitating roll or shaft D' is passed longitudinally through the seed or grain box or hopper D, the same resting in suitable openings or apertures provided in the end walls thereof, and on one end of said roll or shaft is rigidly secured a small gear wheel or pinion, $d^3$, designed for engagement with a similarly-shaped pinion, $d^4$, secured on one of the short axles $a$.

Secured on the roll or shaft D', immediately in rear of the said gear wheel or pinion $d^4$, is one end of a bent arm or slide, D², the other end of which is secured on the said short axle $a$, the aperture therein being sufficiently large for loosely securing therein one end of a collar, $d^5$, integral with the inner surface of the pinion $d^4$. The aperture in the center of this pinion is of a square shape, corresponding to the square-shaped portion of the inner end of the hub of the adjoining wheel $b$. A suitable hand-lever, D³, is secured near this end of the seed or grain box or hopper D within convenient reach of the operator, and the lower end of said lever is connected by a chain or link with a projecting hook or eye on the rear side of the bent arm or slide $D^2$. The pinion $d^3$ is so disposed on the roll or shaft as to be in engagement with the corresponding pinion, $d^4$, when the latter is forced by means of said lever onto the square-shaped portion of the hub of the wheel. Upon thus placing said pinions in engagement the roll or shaft will of course, upon the moving of the machine, be caused to rotate, thus stirring or agitating the grain or seed in the box or hopper aforesaid.

E E are the drills, of tubular construction and armed at the front sides with knife-like openers E', the same extending from the extreme lower ends of the drills upward to near the upper ends of the latter, and having formed therewith arms $i$, the function of which will appear presently.

F F are the drag bars or beams, which may, if desired, alternately vary in length, and the drills of said beams are connected by ordinary means to the grain or seed dropping openings or apertures of the box or hopper D. These beams are preferably bifurcated where they connect with a flat bar or head, G, having the divergent ends of their bifurcated portions bent downward and entering apertures or perforations in said bar or head. The rear or outer ends of these beams are each adapted to receive an arm, $i$, of the drill-openers, being preferably formed of two plates or parts spread apart sufficiently beyond where they are bolted or fastened together to receive said arm, both which latter and the separated portions of the plates are provided with apertures or perforations, one (the rear) set of which holes receives a metallic pin or pivot, while the other set receives a wooden pin to effect the connection of the drills to the beams, whereby in the event of the drills meeting an obstacle the wooden pins will break and allow the drills to yield and ride over the obstruction, and thus prevent the breaking or damaging of the same, as would otherwise likely occur.

The flat bar or head G is provided at its ends with pivoted supports or hanger-plates G', which are pivoted at their forward ends to the forward ends of the side bars of the frame A. These bars are each provided in the rear ends with a series of apertures, any one of which is caused to register with a single aperture in each side bar of said frame and to receive pins passed through such registering apertures, whereby the depth of penetration of the drills into the soil is regulated and retained at the point of adjustment as against being lifted from their work by resistance of the earth. These drill-beams F are all connected by a bar, H, for co-operation, said bar passing through corresponding apertures in the upper ends of a U-shaped clip, I, of each drill-beam. J is an eyebolt disposed in each U shape clip I of a drill-beam, and through the eye of which passes the bar H, holding it in place, while the straight portion of said bolt passes through and retains in position a spring, K, also disposed in each clip of a drill-beam, and bearing at its lower end upon the drill-beam, the lower portion of the eyebolt working in an aperture or perforation in the drill-beam and in the lower closed end of the clip I. From this arrangement it will be seen that while the springs are of the requisite tension to hold the drills to their work they will permit the same to have a minimum yielding action to still further lessen the liability of the breaking thereof by contact with obstructions.

L is a rock-shaft, hung in short uprights or brackets secured to the upper edges or surfaces of the side bars of the frame A. This shaft is controlled or actuated by a hand-lever, L', reaching up through a slot, $l$, of the bridge or frame B conveniently to the driver, said lever in practice being adapted to engage with teeth, with which said slotted portion of the bridge or frame is designed to be provided, to effect the retention in place of the lever. This shaft is also provided with two arms, $l'$, which are linked to the drill-bar H, whereby, with the aid of the hand-lever L', the drill-beams with the drills can be so elevated as to lift the drills clear of the ground, which is desirable when the drilling operation is completed.

M M are links, secured to the flat bar G and to eyebolts inserted in the front bar of the frame A, and which distribute the pressure or resistance of the drills and their beams upon the frame A, and brace or strengthen the bar G.

Having thus fully described my invention, what I claim, and desire to secure by Letters Patent, is—

1. In a grain-drill, the flat bar or head secured at its ends to adjustable hangers, the drag bars or beams, the drill-tubes, and openers secured to said drill-tubes, in combination with the bar H, to which the U-shaped clip, carrying a bolt and spring is attached, substantially as shown and described.

2. The combination, with the seed box or hopper and the stirring roll or shaft carrying a pinion, of the pinion secured on the axle, having a square-shaped opening, the lever loosely secured on a collar of said latter pinion, and the hand-lever connected to said former lever, said pinion being designed to engage with the wheel-hub, substantially as shown and described.

In testimony whereof I affix my signature in presence of two witnesses.

WILLIAM H. NEWTON.

Witnesses:
H. M. GREGORY,
W. BRINLY.